(12) United States Patent
Chuang

(10) Patent No.: US 6,831,631 B2
(45) Date of Patent: Dec. 14, 2004

(54) PORTABLE COMPUTER AND RELATED METHOD FOR PREVENTING INPUT INTERRUPTION BY WRITE-TRACKING AN INPUT REGION

(75) Inventor: Wei-Pin Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 276 days.

(21) Appl. No.: 09/683,803

(22) Filed: Feb. 19, 2002

(65) Prior Publication Data

US 2003/0080946 A1 May 1, 2003

(30) Foreign Application Priority Data

Oct. 25, 2001 (TW) .......................... 90126451 A

(51) Int. Cl.⁷ .................................. G09G 5/00
(52) U.S. Cl. .................. 345/173; 345/156; 345/157; 345/174; 345/175; 345/179; 178/18.01; 178/18.06; 178/18.1; 178/19.05
(58) Field of Search ................. 345/173, 156, 345/157, 174, 175, 179; 178/18.01, 18.06, 18.1; 128/19.05

(56) References Cited

U.S. PATENT DOCUMENTS

| | | | | |
|---|---|---|---|---|
| 5,740,390 A | * | 4/1998 | Pickover et al. | 345/835 |
| 5,757,358 A | * | 5/1998 | Osga | 345/862 |
| 6,023,265 A | * | 2/2000 | Lee | 345/173 |
| 6,590,567 B1 | * | 7/2003 | Nagao et al. | 345/173 |
| 6,643,824 B1 | * | 11/2003 | Bates et al. | 715/501.1 |
| 6,687,119 B2 | * | 2/2004 | Lai et al. | 361/683 |
| 6,690,363 B2 | * | 2/2004 | Newton | 345/173 |
| 2002/0167621 A1 | * | 11/2002 | Chen | 349/12 |

* cited by examiner

Primary Examiner—Bipin Shalwala
Assistant Examiner—Vincent E. Kovalick
(74) Attorney, Agent, or Firm—Winston Hsu

(57) ABSTRACT

A method is provided for a portable computer. The portable computer has a touch panel for sensing a position of pressure exerted by a user. The method includes setting an input region on the touch panel. When the user touches the touch panel after a previous touch, the method includes updating the position of the input region according to the relative displacement between the touches, and controlling the portable computer only according to pressure position inside the input region if the user simultaneously presses inside and outside the input region within the touch panel.

16 Claims, 9 Drawing Sheets

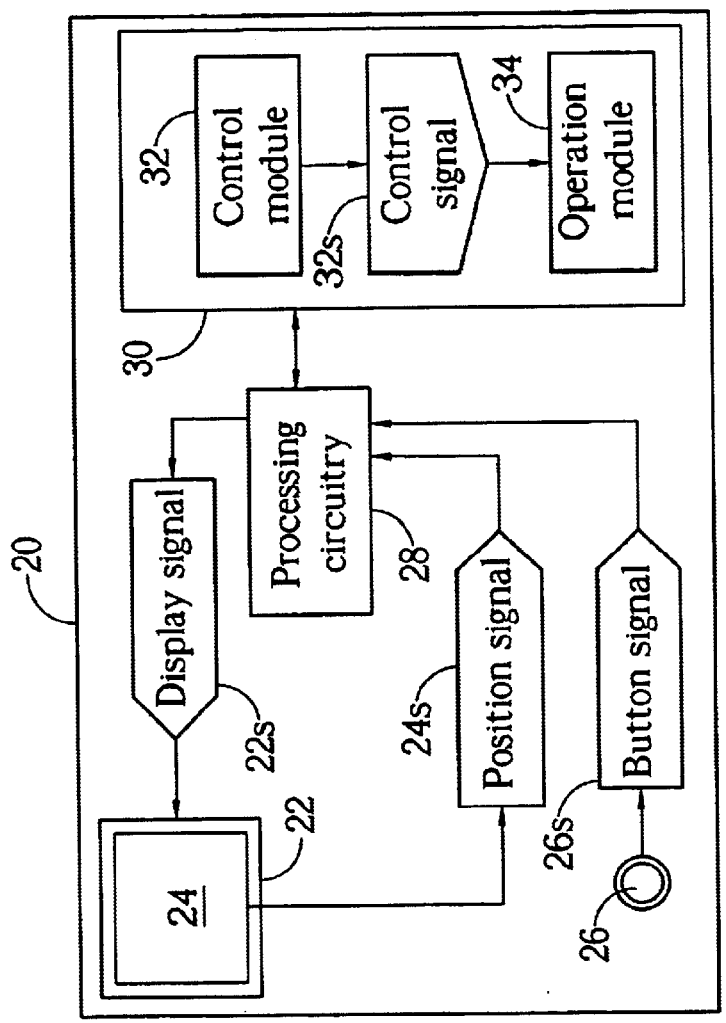
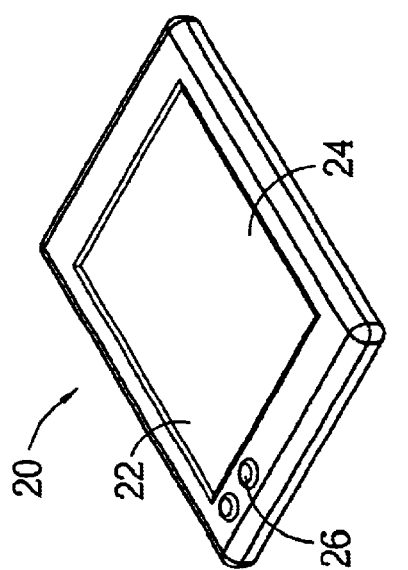
Fig. 2B
Fig. 2A

PORTABLE COMPUTER AND RELATED METHOD FOR PREVENTING INPUT INTERRUPTION BY WRITE-TRACKING AN INPUT REGION

BACKGROUND OF INVENTION

1. Field of the Invention

The present invention relates to a portable computer and related control methods, and more specifically, the present invention discloses a portable computer and related control methods for preventing input interruption by write-tracking an input region.

2. Description of the Prior Art

In modern society, a computer system with a capability for dealing with digital signals is one of the major prerequisites for arranging, storing, and exchanging data and information. Especially, a portable computer (such as a personal digital assistant, PDA) with a small size and light weight is one of the best digital-data platforms for a user to look up, review, and store digital data.

The portable computer usually uses a user interactive touch screen functioning as an interface between a user and the portable computer to display digital data on a large-area screen. The user interactive touch screen can display pictures and writing data. In addition, the user interactive touch screen functions as a touch panel for sensing a position of pressure exerted by a user for controlling the portable computer, according to different pressure position within the touch panel. Furthermore, due to advancement of handwriting identification technology, the user can directly press the touch panel to write down information when the user wishes to input the information to the portable computer. Therefore, the portable computer can identify the information inputted by the user according to write-traces of the user detected by the touch panel so as to input the information to the portable computer. The handwriting input can not only reduce space occupied by the portable computer, but also supply a better interface so that the user can control the portable computer via the touch panel.

Since technology of display devices and screens is advanced and costs of portable computers are being reduced, areas of the screen and the touch panel of the portable computer are being gradually enlarged. Nevertheless, if the user accidentally touches the portable computer, an unwanted interruption can be easily caused.

Please refer to FIG. 1A and FIG. 1B. FIG. 1A is a diagram of a portable computer 10 when a user inputs information to the portable computer 10 through handwriting according to the prior art. FIG. 1B is a diagram of pressure positions on the portable computer 10 depicted in FIG. 1A. As shown in FIG. 1A, the portable computer 10 comprises a user interactive touch screen having a touch panel 14 and a screen 12 for displaying data and pictures. When a user uses a touch pen 16 to touch the touch panel 14, the touch panel 14 will detect a pressure position 18A exerted by the touch panel 14 and identify data and commands of the portable computer 10 inputted by the user according to position variation corresponding to write-traces of the pressure position 18A.

Nevertheless, when the user uses the touch pen 16 to touch the touch panel 14, a portion of the user's hand will unavoidably touch the touch panel 14 and simultaneously produce a number of pressure positions on the touch panel 14. As shown in FIG. 1B, a pressure position 18A is formed by the touch pen 16, and a pressure position 18B is formed by the hand of the user. When the touch panel 14 simultaneously senses the pressure positions 18A and 18B, the touch panel 14 has no way of differentiating which pressure position is the pressure position 18A of the touch pen 16. Therefore, the portable computer 10 cannot exactly differentiate commands inputted by the user, and is not able to correctly control the portable computer 10.

SUMMARY OF INVENTION

It is therefore a primary objective of the claimed invention to provide a touch input method and related devices capable of preventing input interruption caused by a user by write-tracking an input region so as to overcome defects of the prior art.

The claimed invention, briefly summarized, discloses a method for a portable computer. The portable computer has a touch panel for sensing a position of pressure exerted by a user. The method includes setting an input region on the touch panel. When the user touches the touch panel after a previous touch, the method includes updating the position of the input region according to the relative displacement between the touches, and controlling the portable computer only according to pressure position inside the input region if the user simultaneously presses inside and outside the input region within the touch panel.

It is an advantage of the claimed invention that the claimed invention utilizes the write-tracking input region to prevent an accidental touch caused by the user from interfering with a touch input process. The claimed invention cannot only provide an easy and smooth handwriting touch input, but also eliminate the accidental touch caused by the user so as to enhance efficiency of the portable computer.

These and other objectives and advantages of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 2A is a diagram of a portable computer according to the present invention.

FIG. 2B is a block diagram of the portable computer depicted in FIG. 2A.

DETAILED DESCRIPTION

Figure 1B:
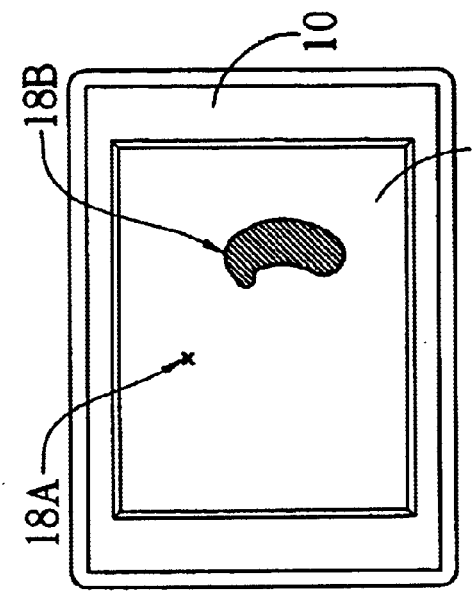
FIG. 1B is a diagram of pressure positions on the portable computer depicted in FIG. 1A.
Figure 1A:
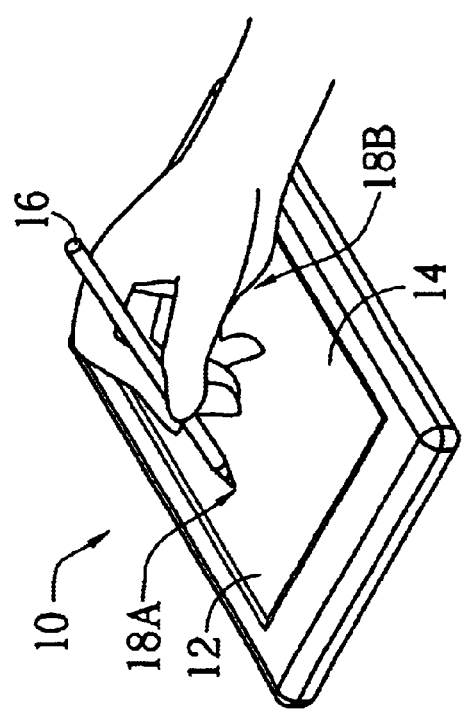
FIG. 1A is a diagram of a portable computer when a user inputs information to the portable computer through handwriting according to the prior art.

Please refer to FIG. 2A and FIG. 2B. FIG. 2A is a diagram of a portable computer 20 according to the present invention.

FIG. 2B is a block diagram of the portable computer 20 depicted in FIG. 2A. As shown in FIG. 2A and FIG. 2B, the portable computer 20 comprises a screen 22 for displaying data of writings and pictures, a touch panel 24 for sensing a position of pressure by a user and generating a corresponding position signal 24s, and a button 26 capable of being pressed by the user and generating a corresponding button signal 26s for controlling the portable computer 20. The touch panel 24 and the screen 26 are combined to form a user interactive touch screen.

The portable computer 20 comprises processing circuitry 28 and a memory 30. The processing circuitry 28 is used to process the whole operation of the portable computer 20 that comprises a central processing unit (CPU) for computing and processing data, interface circuitry for integrating the position signal 24s and the button signal 26s, graph circuitry for controlling display of the screen 22 via a display signal 22s, and a flash memory for storing non-volatile data (for clarity in presenting the present invention, the CPU, the interface circuitry, the graph circuitry, and the flash memory are all omitted in FIGS. 2A and 2B). The memory 30 can be a random access memory (RAM). When the processing circuitry 28 operates, the processing circuitry 28 will compute and process data according to programs loaded in the memory 30.

In the preferred embodiment of the present invention, the portable computer 20 utilizes a control module 32 and an operation module loaded in the memory 30 to process and control processing of the touch input. The operation module 34 can be an operation system (OS) of the portable computer 20 or handwriting identification software. The control module 32 is used to process the touch input and then transform the input into a control signal 32s which is accepted by the operation module 34. The position signal 24s generated by the touch panel 24 will be transmitted to the control module 32 via the processing circuitry 28 in an appropriate data format. The control module 32 generates and transmits the corresponding control signal 32s to the operation module 34 according to the position signal 24s, and then the processing circuitry 28 can control the portable computer to perform corresponding operation.

Figure 3B:
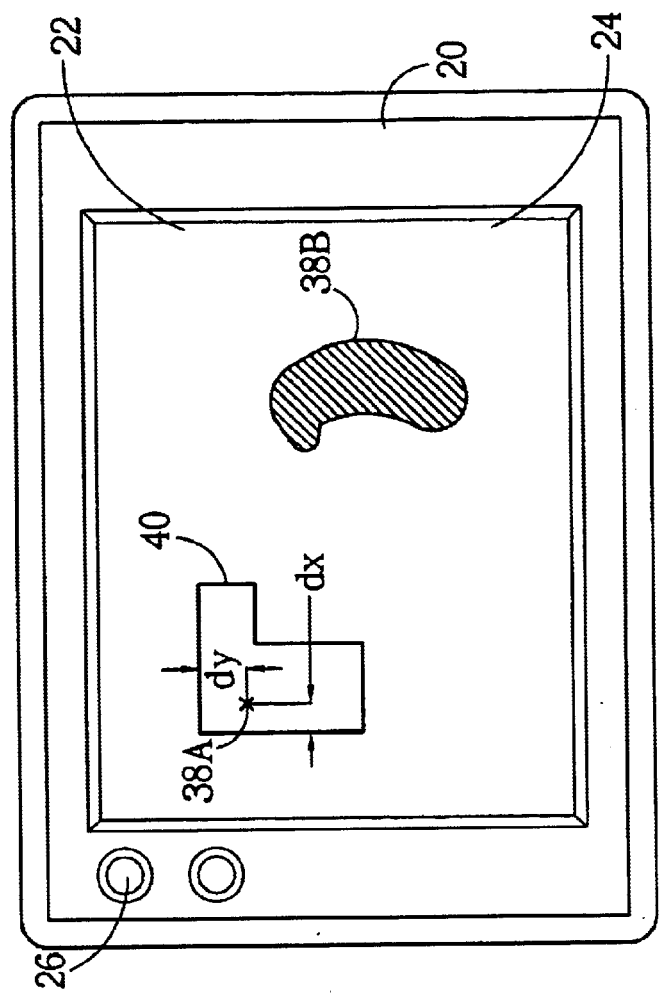
FIG. 3B is a diagram of an input region according to the present invention.
Figure 3A:
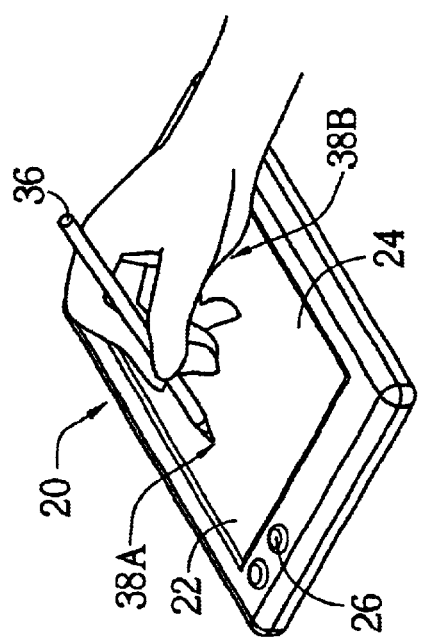
FIG. 3A is a diagram of the portable computer depicted in FIG. 2A when a user inputs information to the portable computer through handwriting.

Please refer to FIG. 3A and FIG. 3B. FIG. 3A is a diagram of the portable computer 20 depicted in FIG. 2A when a user inputs information to the portable computer 20 by using a touch pen 36. FIG. 3B is a diagram of an input region 40 according to the present invention. As shown in FIG. 3A, when the user uses the touch pen 36 to touch the touch panel 24 and produce a correct pressure position 38A, a portion of the user's hand will unavoidably touch the touch panel 24 and simultaneously produce a pressure position 38B accidentally on the touch panel 24. As shown in FIG. 3B, the control module 32 can delimit an input region 40 on the touch panel 24 for preventing the pressure position 38B from influencing touch operations or handwriting input by the user. A region enclosed by oblique lines illustrates the pressure position 38B. The pressure position 38A is a closed region enclosed by the input region 40 whose area is smaller than area of the touch panel 24. A relative position between the input region 40 and the pressure position 38A exerted by the touch pen 36 is fixed, specifically, distances dx and dy between boundaries of the input region 40 and the pressure position 38A are fixed. As soon as the pressure position 38A moves a certain displacement, the input region 40 can also move the same displacement and maintain a shape of the input region 40. That is, the input region 40 has a moving status that follows the pressure position 38A exerted by the touch pen 36.

Figure 4:
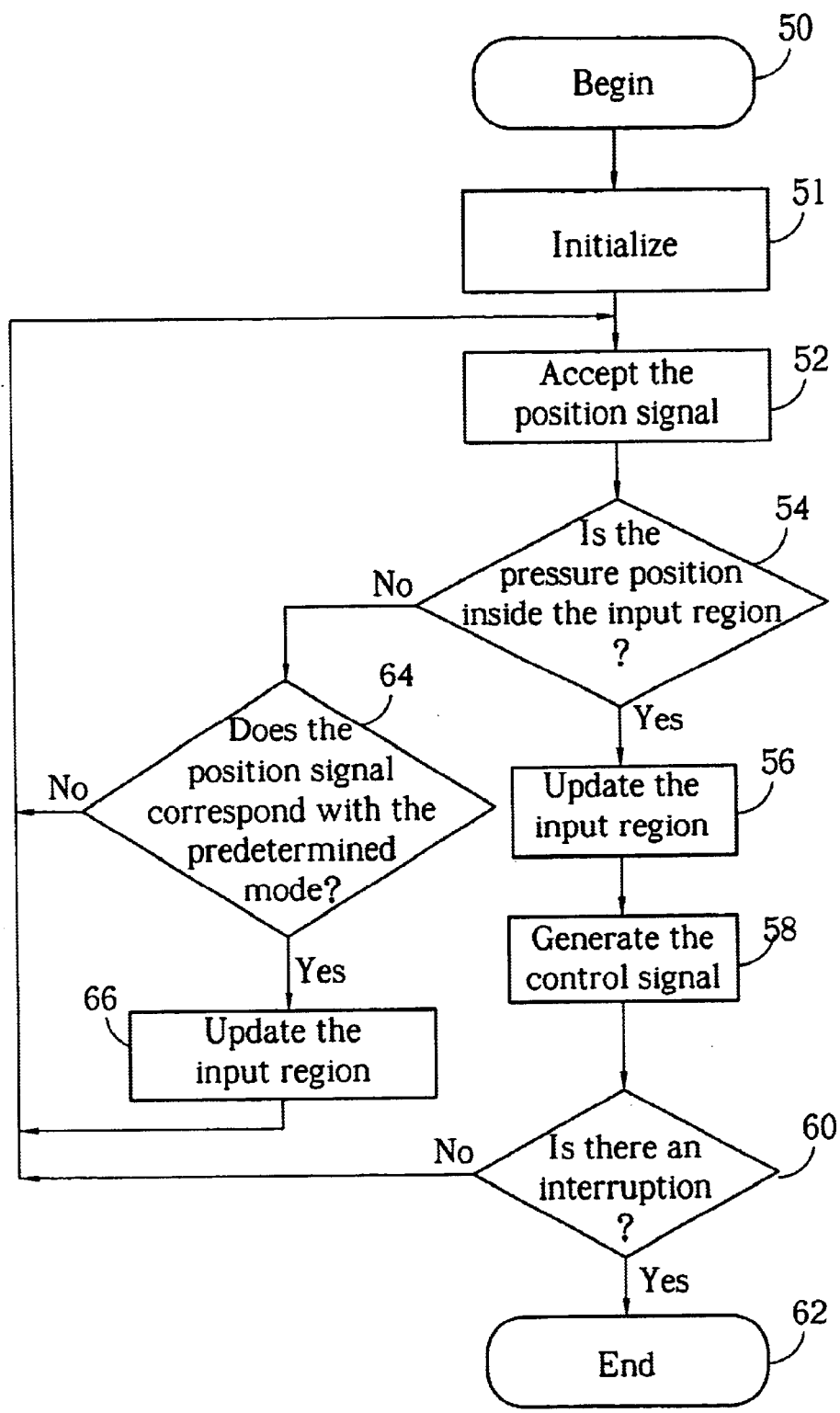
FIG. 4 is a flow chart of the portable computer depicted in FIG. 2A when the portable computer accepts a touch input.

Please refer to FIG. 4. FIG. 4 is a flow chart of a control procedure controlled by the control module 32. The control module 32 will appropriately ignore position signals generated by pressure positions outside the input region 40 so as to prevent the pressure positions touched by the user from interrupting the control procedure. The control procedure is performed as in the following steps: step 50: begin to utilize the control module 32 to control position signals generated via touching the touch panel 24; step 51: initialize to predetermine shape of an input region; step 52: accept the position signals; the touch panel 24 will generate the corresponding position signals after being touched by a user and then transmit the position signals to the control module 32 through the processing circuitry 28 to be processed further; step 54: determine if pressure positions are located inside the input region; if so, perform step 56; if not, perform step 64; step 56: update the position of the input region according to the pressure positions; as shown in FIG. 3B, the pressure position 38A is enclosed by the input region, and when a user starts to continuously move the touch pen 36 on a certain spot of the touch panel 24, the pressure position of the touch pen 36 must pass through the previous input region; simultaneously, the position signal of the pressure position of the touch pen 36 will lead the procedure to this step via step 54 to maintain a constant relative displacement between the input region and the touch pen 36 according to a new input region of the pressure position; step 58: generate control signals according to the corresponding position of the pressure positions; the pressure positions located inside the input region are all effective touch inputs so that the control module 32 can generate the corresponding control signals according to the position signals of the effective touch inputs and transmit the control signals to the operation module 34 to perform corresponding operation; for example, the control module 32 can convert variation of traces of the position signals into the control signals, and the operation module 34 can identify the traces and convert the traces into writing data so as to produce handwriting input; step 60: check if the operation of the control module 32 is interrupted or not; if not, jump to step 52 to accept new updated position signals; if so, go to step 62 to finish the operation of the control module; furthermore, interrupting signals are generated from the operation module 34 or by pushing the button 26; step 62: end; step 64: check if variation of the position signals corresponds with a predetermined mode; pressure positions located outside the input region may be accidental touches by the user or another region that the user wishes to input on the touch panel 24; for differentiating between the above-mentioned situations, the user can use a certain predetermined mode to display the situation that is wished to input on another region; for example, the predetermined mode may be fast, repetitive, and constant taps; that is, when the user wishes to start the touch input at a location outside the original input region on the touch panel 24, the user can tap quickly on a location 3 times (the predetermined mode) by using the touch pen 36, the control module 32 identifies the touch input as corresponding with the predetermined mode so as to further perform step 66; if the touch input is located outside the input region and does not correspond with the predetermined mode, the control module 32 will ignore the touch input and go back to step 52 to continue accepting the position signals; of course, the predetermined mode can be formed in many types, the main objective of the predetermined mode is to exactly differentiate between the accidental touch input and the wished touch input, since the touch input of the predetermined mode has a shorter time interval and a smaller range than the accidental touch input; and step 66: update the position of the input region according to the position signals given in step 64.

Figure 5A:
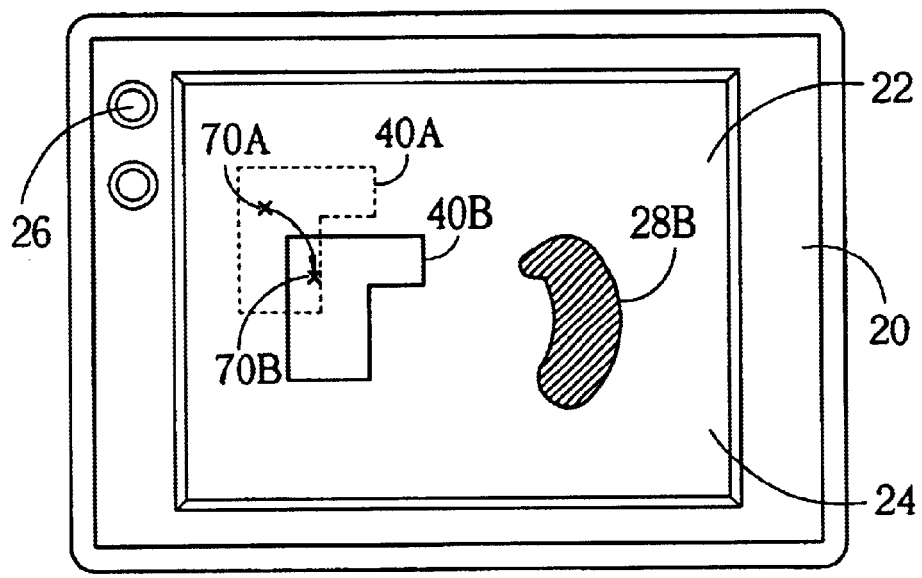
FIG. 5A to FIG. 5F are diagrams of the input region while a position of the input region is changed.

As shown in the aforementioned procedure of the preferred embodiment of the present invention, the pressure position 38B depicted in FIG. 3A and FIG. 3B is effectively ignored so as not to interfere with the normal touch input. Please refer FIG. 5A to FIG. 5F. FIG. 5A to FIG. 5F are diagrams of the input region while a position of the input region is changed. As shown in FIG. 5A, the user utilizes the touch pen 36 to input at a pressure position 70A on the touch panel 24. An enclosed region 40A is the input region corresponding to the pressure position 70A. When the touch pen 36 is moved from the pressure position 70A to a pressure position 70B along an orbit indicated by an arrow depicted in FIG. 5A, the input region 40A is simultaneously moved to a new input region 40B by repetitively performing steps 52, 54, 56, 58 and 60 shown in FIG. 4. Furthermore, a position signal generated by the user accidentally touching the pressure position 28B on the touch panel 24 will be transmitted to step 52 and eliminated through steps 54 and 64.

Figure 5B:
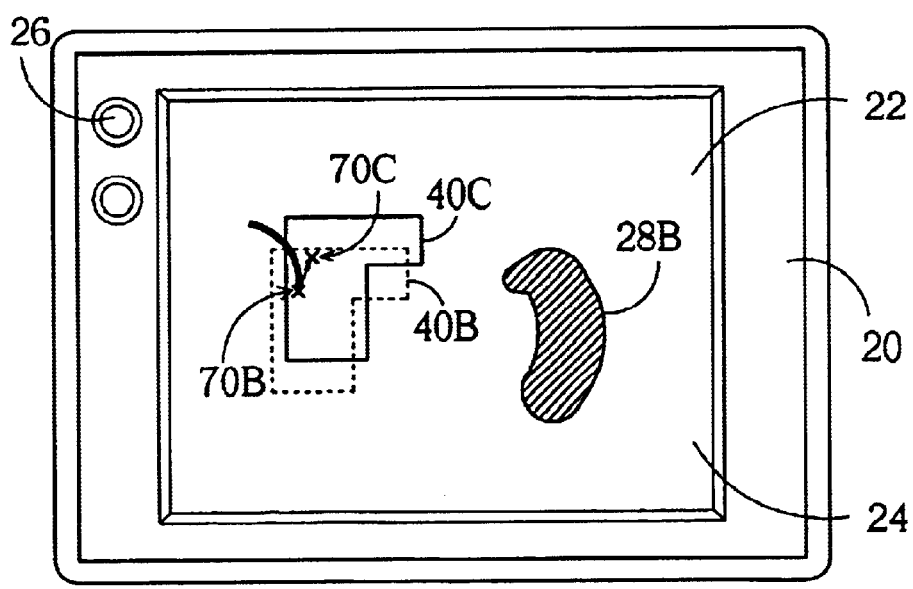
Figure 5C:
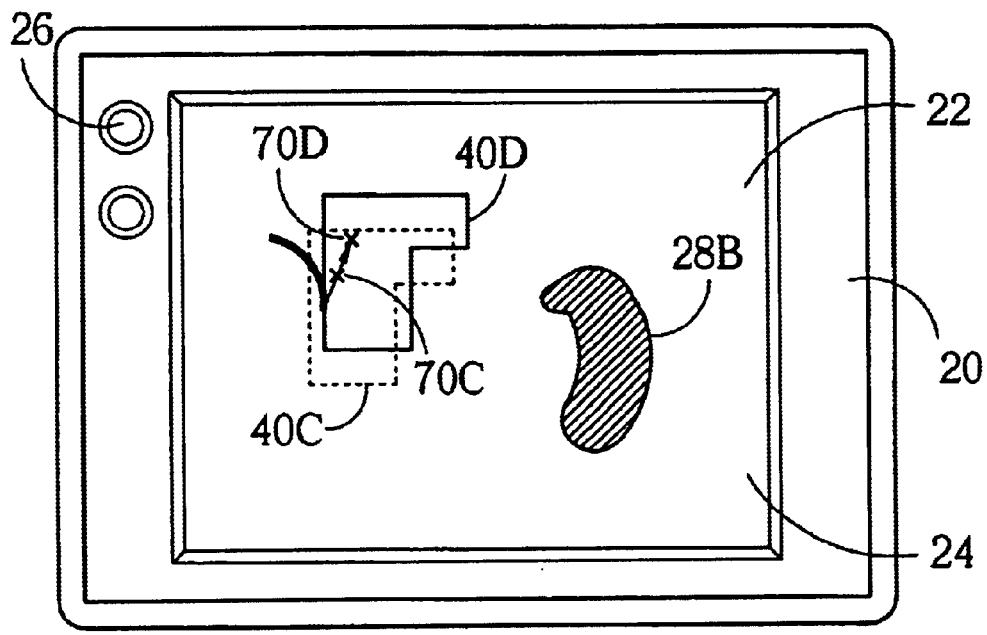
Figure 5D:
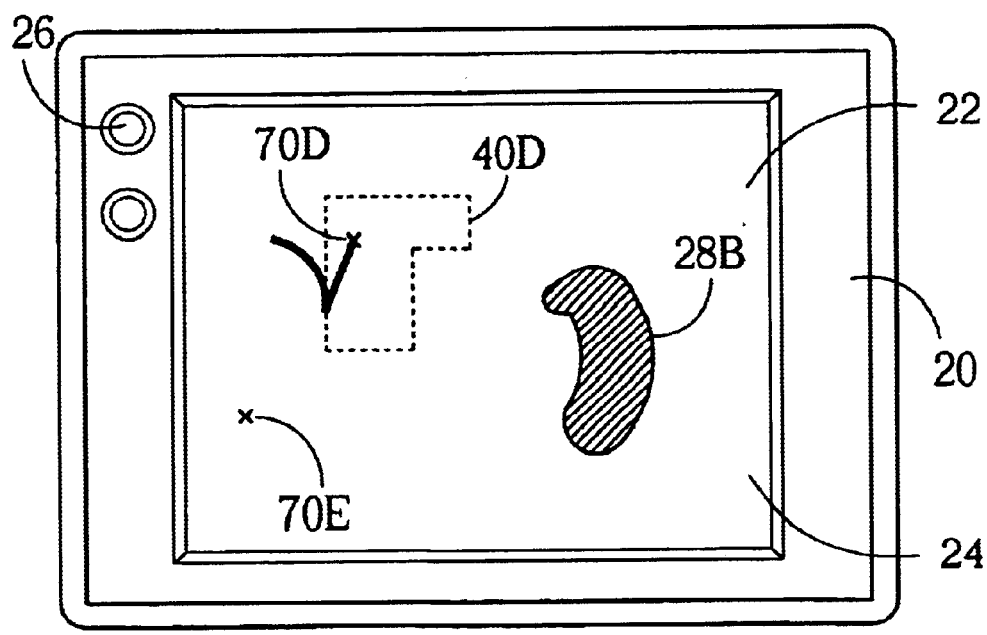
Figure 5E:
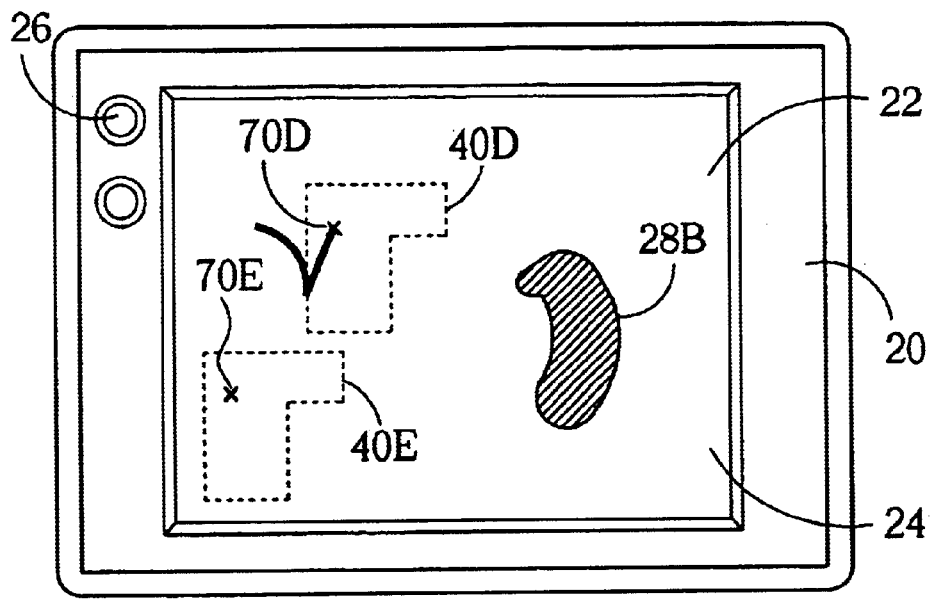

As shown in FIG. 5B, when the touch pen 36 is moved from the pressure position 70B to a pressure position 70C along an orbit indicated by the arrow, the input region 40B is also moved to a new input region 40C. As shown in FIG. 5C, when the touch pen 36 is moved from the pressure position 70C to a pressure position 70D along an orbit indicated by the arrow, the input region 40C is also moved to a new input region 40D. As shown in FIG. 5D, the user stops to move the touch pen 36 at the pressure position 70D so that the final input region 40D is the region 40D enclosed by dotted lines. From FIG. 5A to FIG. 5D, the control module 32 eliminates the pressure position 28B located outside the input region and transmits the control signal to the operation module 34 to inform that the user has input an effective touch orbit with a V shape. As shown in FIG. 5E, when the user wishes to input from a target position 70E, the input region still stays at the region 40D so that the target position 70E is not included within the effective input region 40D. Then, the user can use the predetermined mode to quickly tap 3 times at the target position 70E. The position signal of the predetermined mode will be transmitted to the control module 32 to directly reset a new input region 40E of the target position 70E from the original input region 40D, according to steps 64 and 66 of FIG. 4. Therefore, the target position 70E, functioning as a new pressure position, will be an effective input position for the user to begin a new touch input. Additionally, the touch mode of the pressure position 28B does not corresponded with the predetermined mode so that the pressure position 28B still does not interfere with the normal touch input, and will be eliminated by the flow chart of FIG. 4.

Figure 5F:
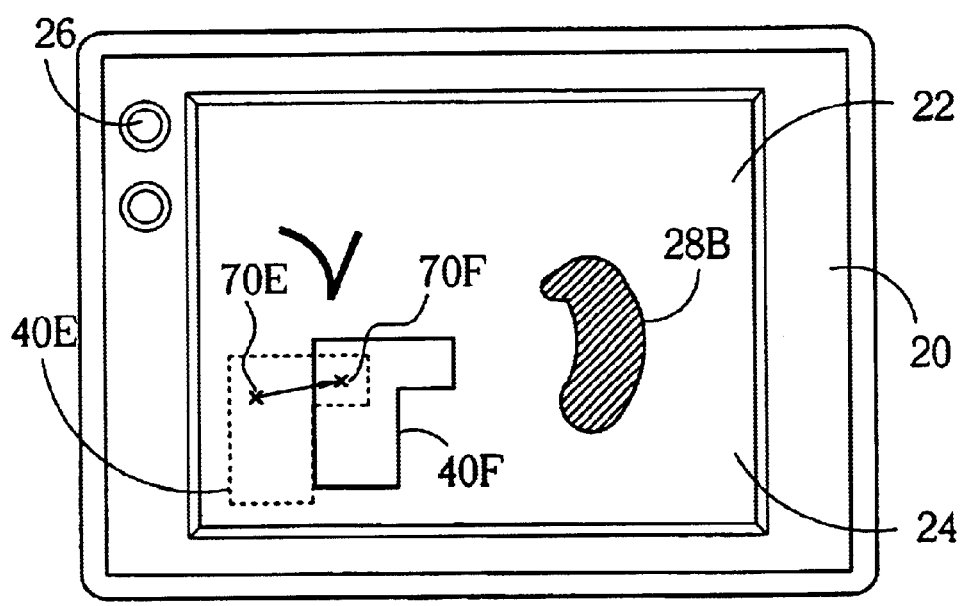

As shown in FIG. 5F, the input region will be moved to the new input region 40E after the user performs a touch input of the predetermined mode at the target position 70E. The user can begin to perform a normal touch input from the target position 70E so as to move the pressure position of the touch pen 36 from the target position 70E to a pressure position 70F along an arrowed orbit depicted in FIG. 5F. Furthermore, the control module 32 moves the input region from the region 40E to a new input region 40F according to steps 52, 54, 56 and 58 of FIG. 4 so as to prevent the pressure position 28B from interfering with the normal touch input.

Figure 6:
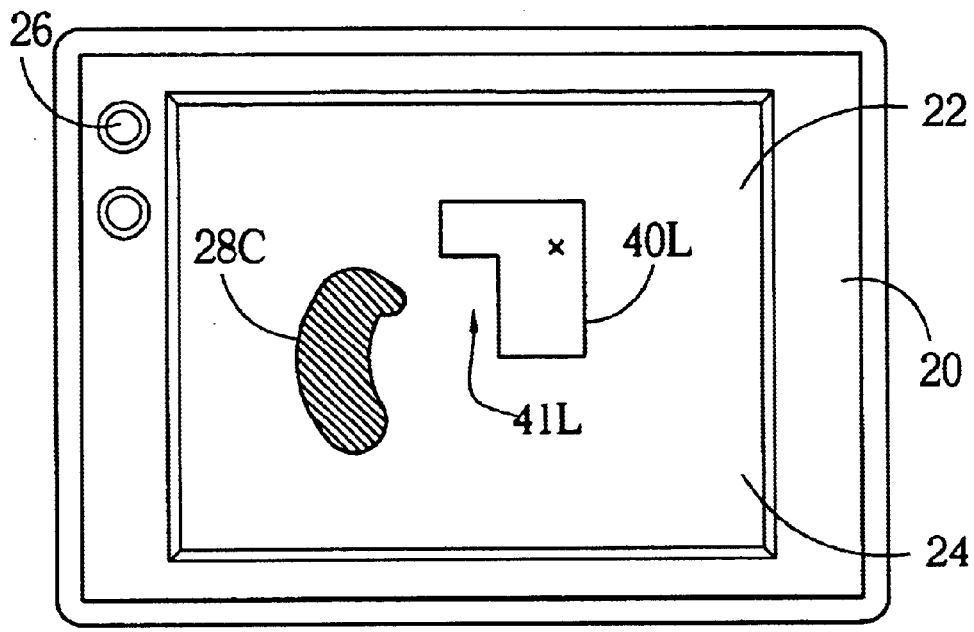
FIG. 6 is a diagram of an input region of another preferred embodiment according to the present invention.

As shown in FIG. 3A and FIG. 3B, when the user uses his right hand to hold the touch pen 36, a right portion of the touch panel 24 can easily be accidentally touched by the user, so a right portion of the input region 40 can be formed into a vacancy so as to prevent the input region 40 from overlapping with the accidental pressure position 28B. Please refer to FIG. 6. FIG. 6 is a diagram of the input region of another preferred embodiment of the present invention when the user's left hand is used. As shown in FIG. 6, when the user uses his left hand to hold the touch pen 36, a left portion of the touch panel 24 is easily accidentally touched by the user, so a left portion of the input region 40L can be formed into a vacancy 41L so as to prevent the input region 40L from overlapping with a accidental pressure position 28C. Furthermore, the screen 22 of the portable computer 20 can display the input region by many ways. For example, the screen can indicate the input region with a region having a certain color or a dotted line so as to exactly identify the position of the input region for the user.

Figure 7A:
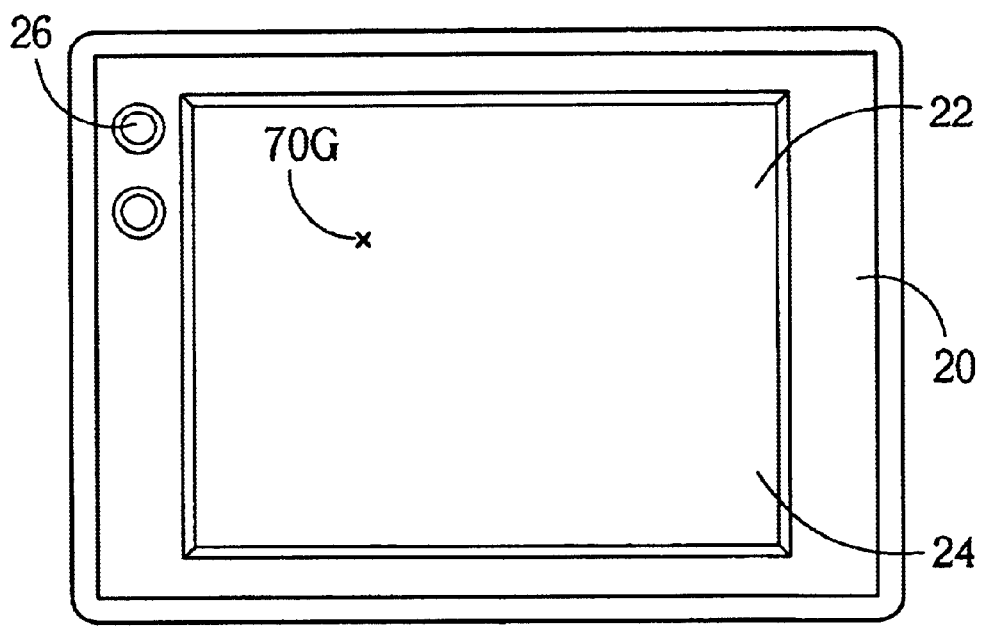
FIG. 7A to FIG. 7C are diagrams of a process when a shape of the input region depicted in FIG. 3B is self-defined by a user.
Figure 7B:
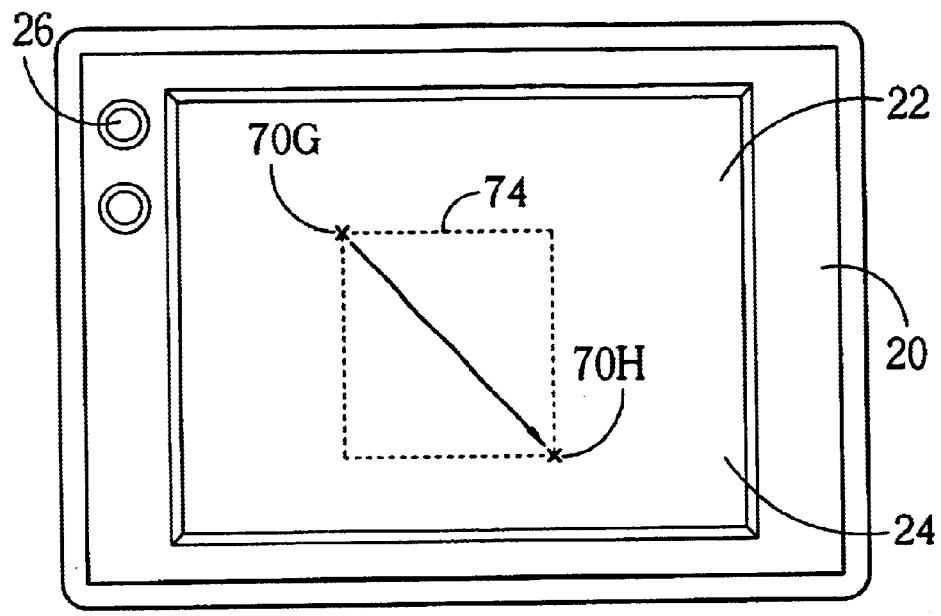
Figure 7C:
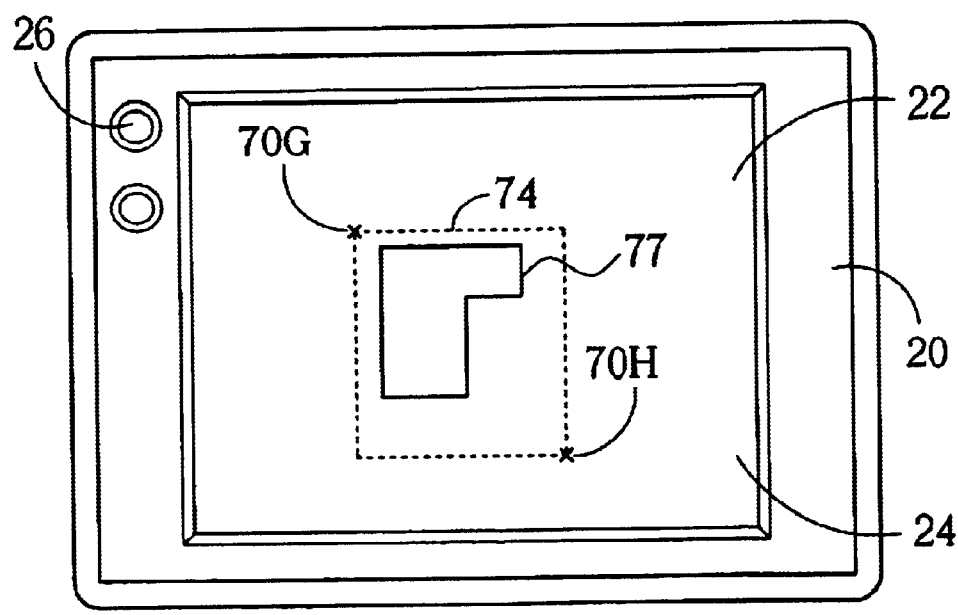

Shape of the input region of the present invention can be self-defined by the user in step 51 of FIG. 4. Please refer to FIG. 7A to FIG. 7C. FIG. 7A to FIG. 7C are diagrams of a process while shape of the input region is self-defined by the user. As shown in FIG. 7A, the user can utilize the touch pen 36 to perform a touch input of the predetermined mode (such as fast tapping 3 times) at a first target spot 70G on the touch panel 24 to inform the control module 32 that the user wishes to self-define the shape of the input region. As shown in FIG. 7B, the user can control the touch pen 36 to move from the first target spot 70G to a second target spot 70H so as to define a definition region 74. As shown in FIG. 7C, the user can utilize the touch pen 36 to draw a shape of an input region 77 within the definition region 74. Of course, the user can store the shape of the input region 77 in step 51 or download the previous defined shape of the input region, or modify the previous defined shape of the input region.

In contrast to the prior art, the present invention utilizes the write-tracking input region to prevent the accidental touch caused by the user from interfering with a touch input process. The present invention cannot only provide an easy and smooth handwriting touch input, but also eliminate the accidental touches caused by the user so as to enhance efficiency of the portable computer. Furthermore, the preferred embodiment of the present invention cannot only utilize software stored in the memory to function as the control module, but also utilize hardware circuitry to function as the control module to directly convert the position signals of the touch panel into the appropriate control signals.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for a portable computer, said portable computer comprising a touch panel for sensing a position of pressure exerted by a user, said method comprising:

setting an input region on said touch panel, wherein said input region is smaller than said touch panel;

updating location of said input region, when a user touches said input region after a previous touch within said input region, according to relative displacement between said touches; and controlling said portable computer only according to pressure position inside said input region if said user simultaneously presses inside and outside said input region within said touch panel.

2. The method of claim 1, wherein when said user presses a reset region on said touch panel and outside said input region exceeding a predetermined times in a pre-selected time period, position of said input region is updated whereby said input region includes said reset region.

3. The method of claim 1, wherein said portable computer further comprises a screen for displaying images.

4. The method of claim 3, wherein said screen is a user interactive touch screen and said touch panel is set on said screen.

5. The method of claim 1, wherein said portable computer is a Personal Digital Assistant (PDA).

6. The method of claim 1, wherein shape of said input region is capable of being defined by said user.

7. A computer comprising:
- a touch panel capable of generating a position signal corresponding to a pressurized position on said touch panel; and
- a control module connecting to said touch panel for controlling said computer according to said position signal;
- wherein when a user presses said touch panel twice at two different pressure positions within an input region of said touch panel, said control module displaces said input region according to relative displacement between said two pressure positions, while said control module controls said computer only according to pressure position inside said input region if said user simultaneously presses inside and outside said input region within said touch panel.

8. The method of claim 7, wherein when said user presses a reset region on said touch panel and outside said input region exceeding a predetermined times in a pre-selected time period, position of said input region is updated whereby said input region includes said reset region.

9. The method of claim 7, wherein said computer further comprises a screen for displaying images.

10. The method of claim 9, wherein said screen is a user interactive touch screen and said touch panel is set on said screen.

11. The method of claim 7, wherein said computer is a Personal Digital Assistant (PDA).

12. The method of claim 7, wherein shape of said input region is capable of being defined by said user.

13. A method for controlling a computer with a touch panel, the touch panel sensing a location of pressure exerted by a user, the method comprising:
- defining a position of an input region on the touch panel;
- controlling the computer according to the location inside the input region of pressure exerted by the user; and
- when the user exerts pressure at a second location inside the input region after the user had previously exerted pressure at a first location inside the input region, displacing the position on the touch panel of the input region according to displacement between the first location and the second location.

14. The method of claim 13 wherein the user can define a new position of the input region by activating a predetermined mode at the new position.

15. The method of claim 14 wherein the predetermined mode comprises the user exerting pressure on the touch panel outside of the input region exceeding a predetermined times in a pre-selected time period.

16. The method of claim 15 wherein when the user exerts pressure on the touch panel outside of the input region and does not activate the predetermined mode, the computer is not controlled according to the exerted pressure.

* * * * *